United States Patent [19]

Reich

[11] Patent Number: 4,492,123
[45] Date of Patent: Jan. 8, 1985

[54] THERMAL CONDUCTIVITY VACUUM GAGE

[75] Inventor: Günther Reich, Cologne, Fed. Rep. of Germany

[73] Assignee: Leybold-Heraeus GmbH, Cologne, Fed. Rep. of Germany

[21] Appl. No.: 364,099

[22] Filed: Mar. 31, 1982

[30] Foreign Application Priority Data

Aug. 3, 1981 [DE] Fed. Rep. of Germany ....... 3130817

[51] Int. Cl.³ ...................... G01N 25/00; G01N 27/18
[52] U.S. Cl. ........................................ 73/755; 374/141
[58] Field of Search ........................... 73/755; 374/143

[56] References Cited

U.S. PATENT DOCUMENTS

| | | | |
|---|---|---|---|
| 1,873,984 | 8/1932 | Sieber | 73/755 |
| 1,971,423 | 8/1934 | McIlvaine | 73/755 |
| 2,315,671 | 4/1943 | Tawney | 73/755 X |
| 3,374,676 | 3/1968 | Brenot | 73/755 |
| 3,605,495 | 9/1971 | Krause et al. | 374/143 |
| 3,753,369 | 8/1973 | Fowler et al. | 374/143 X |

Primary Examiner—Daniel M. Yasich
Attorney, Agent, or Firm—Felfe & Lynch

[57] ABSTRACT

A thermal conductivity vacuum gage has a vacuum-sensing probe and a separate operating unit for indicating the vacuum sensed by the probe and supplying electrical power for the vacuum sensing by the probe. An electrically-conducting cable connects the probe to the operating unit to form measuring and power supply circuits therebetween. The portion of the measuring circuit and the portion of the power supply circuit in the operating unit are identical or common, i.e. the same circuit portion, so that variations in the operation of this common circuit portion affect circuits the same in contrast to prior gages having separate measuring and power supply circuits, whereby variations in the operation of one could affect the other.

5 Claims, 9 Drawing Figures

THERMAL CONDUCTIVITY VACUUM GAGE

BACKGROUND

The present invention relates to a thermal conductivity gage with a probe and a separate operating unit, the latter containing an indicator and a power supply for a temperature-dependent resistance element in the probe.

Thermal conductivity vacuum (pressure) gages make use of the fact that, at higher gas pressures, i.e., greater molecule densities, more heat is removed by the gas from a temperature-dependent resistance element in thermal communication with the gas than at lower gas pressures. In the Pirani thermal conductivity vacuum gage, the resistance element is a measuring wire which is connected in a Wheatstone bridge. In the unregulated type of Pirani vacuum gage, a change in the resistance of the measuring wire produces an imbalance in the bridge which is used as a measure of the pressure. In the regulated type of Pirani vacuum gage, the voltage applied across the bridge is constantly regulated in such a way that the resistance and hence the temperature of the measuring wire is constant. This means that the bridge is always balanced. In formerly known regulated Pirani vacuum gages, the voltage across the bridge is then used as the measure of the gas pressure.

In thermal conductivity vacuum gages which operate on the thermoelectric principle, one or more thermocouples are provided as the temperature-dependent resistance element through which a supply current flows. Such thermal conductivity vacuum gages can also be unregulated or regulated.

In all these thermal conductivity vacuum gages there is the disadvantage that small voltage variations must be transmitted from the probe to the operating unit. This makes gage accuracy dependent upon the resistance of the conductors. Furthermore, the transmission of low measuring voltages is unreliable, especially when the point at which the pressure is to be sensed (the probe) is relatively far from the operating unit powering and indicating the sensed pressure.

THE INVENTION

It is therefore the object of the present invention to render the accuracy of a thermal conductivity vacuum gage independent of the physical and electrical nature of the circuitry to the probe.

In accordance with the invention, this object is accomplished in that a power supply circuit provides a current influenced by the temperature dependence of a temperature-dependent resistance element in a probe, as described for vacuum measurement above, in a measuring circuit and in that portions of the measuring circuit and the power supply circuit in an operating unit separate from the probe are identical, i.e., common, the same. This also makes it possible to connect the probe to the operating unit with only two conductors which carry the sum of the two currents (power supply current and measuring current). The vacuum (pressure) indicating and the power supply currents are thus made independent of conductor and contact resistances all the way to the probe, so that variations of accuracy due to these will no longer occur. Reliability is also improved to a considerable extent.

Another advantage is obtained in the case of thermal conductivity vacuum gages to which a plurality of probes can be attached. To form the power supply circuits and measured current circuits all that is needed is one common input lead plus only one return lead per probe, so that for N probes only N+1 leads have to be connected to the operating unit. Formerly at least 2×N leads were required.

Additional advantages and details of the invention will be explained below with the aid of preferred embodiments represented in the drawings, in which.

Figure 1:
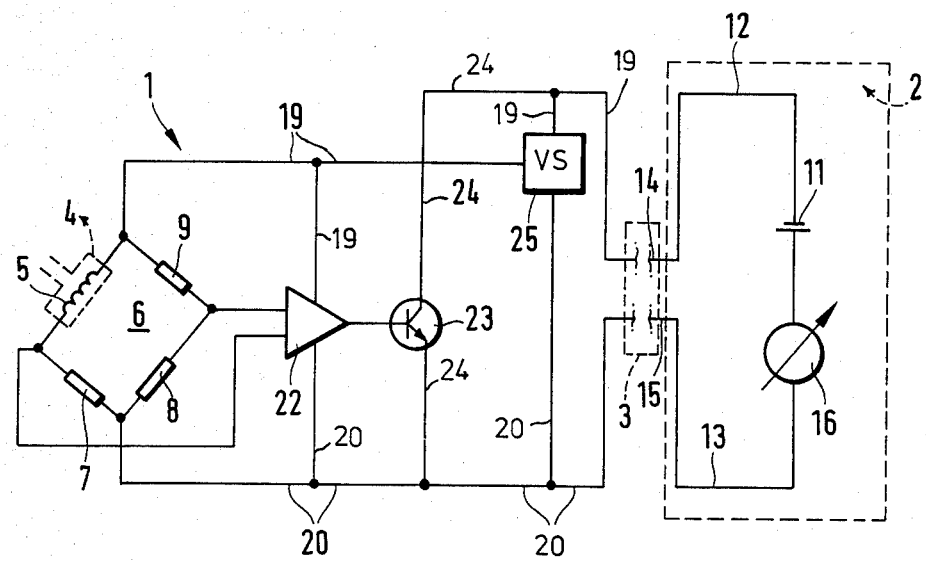
FIG. 1 is a schematic of a first preferred embodiment.
Figure 2:
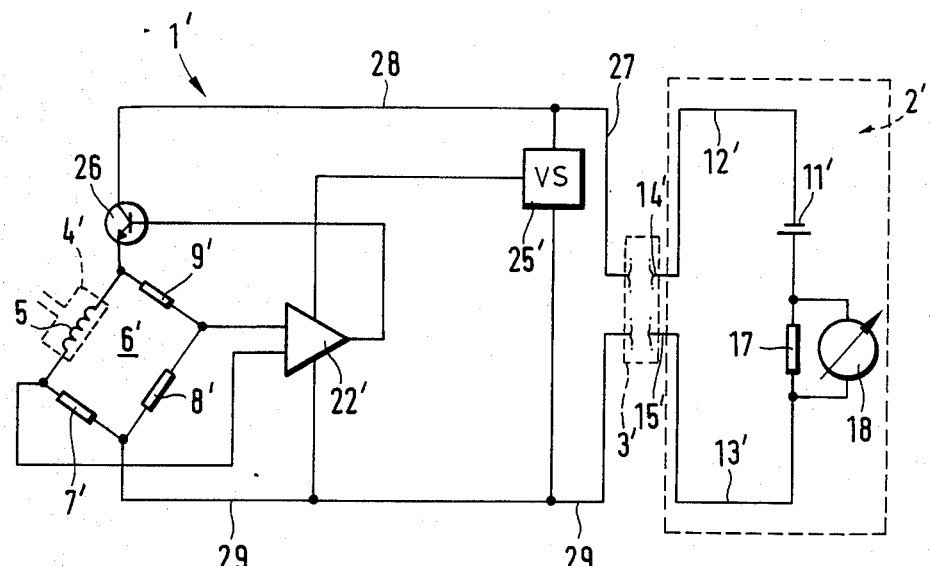
FIG. 2 is a schematic of a second preferred embodiment.

FIGS. 1 and 2 show, respectively, unregulated and regulated Pirani vacuum gages in accordance with the invention. These very-diagrammatic Figures each show a probe 1, 1' on the left and an operating unit 2, 2' represented within broken lines on the right. In each Figure, these two units are connected to one another by a cable 3, 3' which is of a length that varies from case to case. The probes 1, 1' have probe tubes 4, 4', the interiors of which receive the gas from a receptacle, not shown, the pressure of which is to be measured. Within each probe tube 4, 4', and thus in thermal communication with the gas, there is a probe or measuring wire 5, 5' which is connected in a Wheatstone bridge 6, 6' with the additional resistances 7, 7', 8, 8' and 9, 9'.

Each operating unit 2, 2' comprises a power supply 11, 11' and a current indicator 16 (FIG. 1) and 17, 18 (FIG. 2) which are connected by conductors 12, 12' and 13, 13' to two conductors 14, 14' and 15, 15' of cable 3, 3'. In the embodiment shown in FIG. 1, the indicator 16 is an ammeter. In the embodiment shown in FIG. 2, the indicator is a so-called "load" resistance 17 in the conductor 13 which is shunted by voltmeter 18 so that the voltage drop in resistance 17, which corresponds to the current flowing through resistance 17, can be read.

In the unregulated Pirani gage of FIG. 1, a constant voltage is applied to the bridge 6. For this, the portion of the power supply circuit in the probe consists of conductors 19, and 20 which are connected to the cable 3 and voltage stabilizer 25 connected thereto. When pressure variations occur in the probe tube 4, an imbalance is produced in the bridge 6 which is delivered by an amplifier 22 from the bridge 6 to a transistor 23 which is connected by conductors 24 across conductors 19, 20.

The transistor 23 has the effect of a resistor whose resistance responds to or varies in relation to the imbalance of the bridge 6 and thus in relation to the pressure in the tube 4. Thus, a portion of a measuring circuit is formed in the probe 1, consisting of the transistor 23 and conductors 19, 20, and 24, which is therefore partially identical with, i.e. common or the same as the portion (19, 20) of the power supply circuit in the probe 1. The portions of the measuring circuit and power supply circuit that are situated within the operating unit 2, i.e. components 11, 12, 13, 16, are identical, i.e. common or the same. The current variations that can be read on the ammeter 16 as a result of a varying measuring current are a measure of the pressure conditions prevailing in the tube 4. The voltage stabilizer VS 25 is in the probe 1 so that a constant voltage will be produced in the probe 1 for the bridge 6 and the amplifier 22.

In the regulated Pirani gage of FIG. 2, the amplifier 22' serves with the aid of transistor 26 to provide a voltage that constantly balances the bridge 6'. The voltage stabilizer 25' is provided only for supplying the amplifier 22' in the probe 1'. In the regulated Pirani vacuum gage of FIG. 2, therefore, the portions of the measuring circuit and the power supply circuit in the probe 1' which are connected by the conductor sections 27, 28 and 29 are identical. The power supply current with the measuring current superimposed thereon is transmitted by the cable 3' to the operating unit 2', as in the embodiment of FIG. 1.

Figure 3:
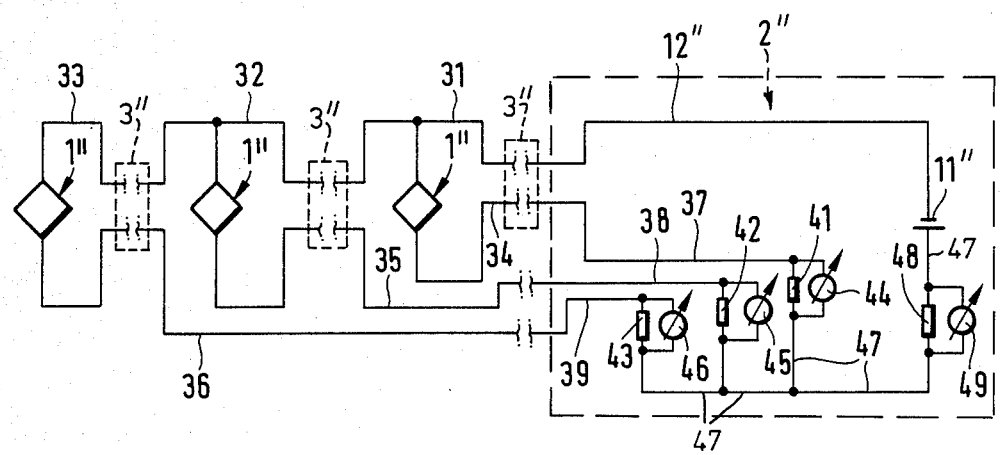
FIG. 3 is a schematic of a third preferred embodiment.

In the embodiment represented in FIG. 3, a total of three probes 1" are, each like the one represented in either FIG. 1 or 2, connected to the operating unit 2". Only one power supply 11" is contained in the operating unit 2" for all of the probes 1". There is one common lead to the probes from the power supply, conductor 12 in the operating unit 2 and the conductors 31, 32 and 33 and cables 3" external thereto. The return lines to the operating unit from the probes 1"are separate conductors 34, 35 and 36, which are connected to conductors 37, 38 and 39 in the operating unit. These each contain a load resistance 41, 42 and 43 with a corresponding voltmeter 44, 45 and 46, and are then connected in common by conductor 47 to the power source 11. The voltmeters 44, 45 and 46 indicate the pressure values detected by the probes 1", and it does not matter whether the individual probes operate on different thermal conductivity vacuum gage principles (regulated, unregulated, Pirani, thermoelectric). Another load resistor 48 is provided in the conductor 47 so that an average pressure can be read on voltmeter 49.

Figure 4:
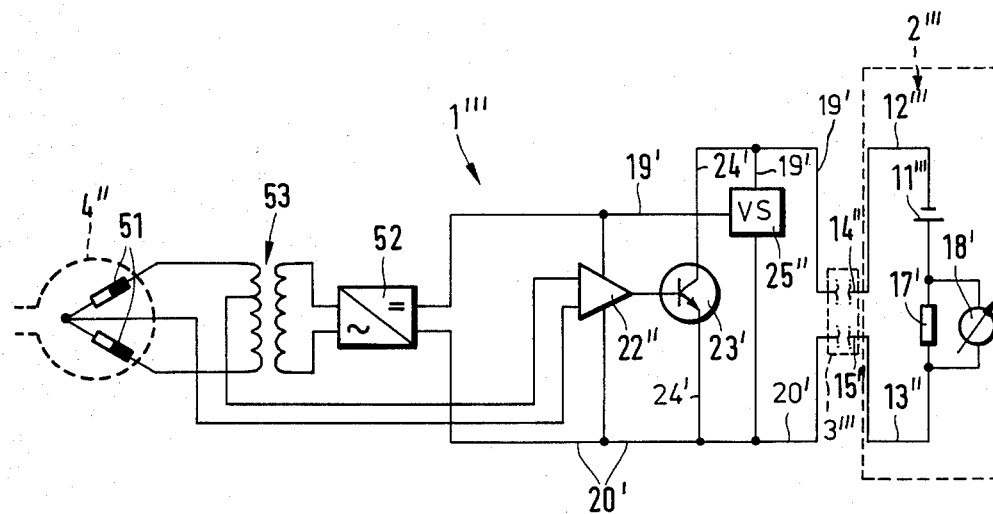
FIG. 4 is a schematic of a fourth preferred embodiment.
Figure 5:
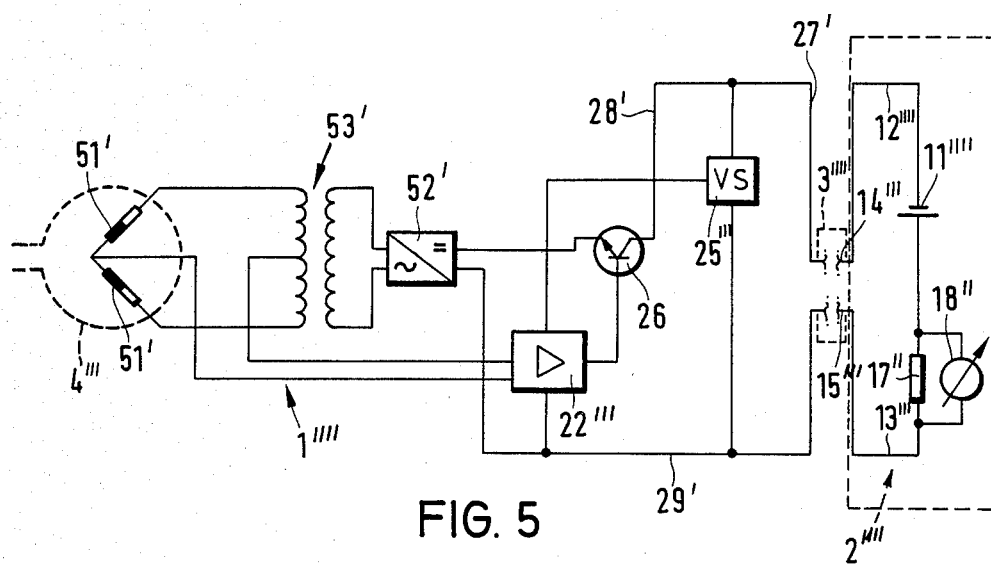
FIG. 5 is a schematic of a fifth preferred embodiment.

FIG. 4 and 5 show, respectively, unregulated and regulated thermal conductivity vacuum gages operating on the thermoelectric principle, but otherwise similar to those of FIGS. 1 and 2. Corresponding components are thus identified with corresponding reference characters.

In each of FIGS. 4 and 5, two thermocouples 51, 51' are connected in series in the probe tube 4", 4"' for supply with alternating current. For this, the DC power supply circuit of probe 1"' of the unregulated vacuum gage of FIG. 4 consists of conductors 19', 20', and a chopper 52 supplies transformers 53 with alternating current. To form the measuring circuit portions 23', 24', in the probe 1"', voltage fluctuations are fed to the amplifier 22"which are picked up between the two thermocouples 51 and approximately the center of the secondary side of the transformer 53. The important difference between the embodiments of FIGS. 1 and 2 and those of FIGS. 4 and 5 is therefore only in the probe.

Figure 6:
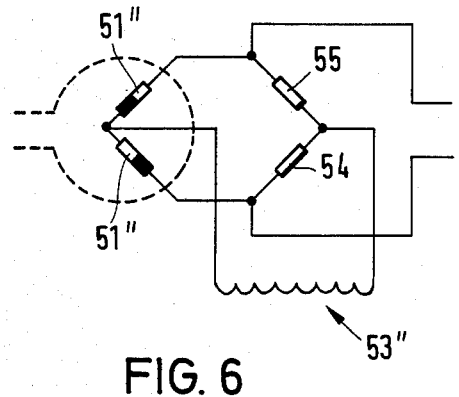
FIG. 6 is a schematic of another preferred embodiment of a probe portion of the preferred embodiment shown in FIG. 5.
Figure 7:
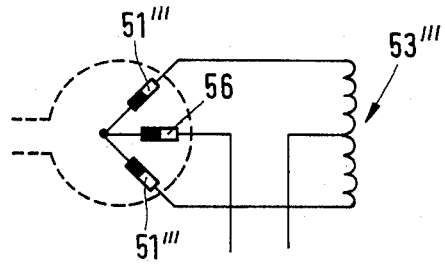
FIG. 7 is a schematic of another preferred embodiment of a probe portion of the preferred embodiment shown in FIG. 5.
Figure 8:
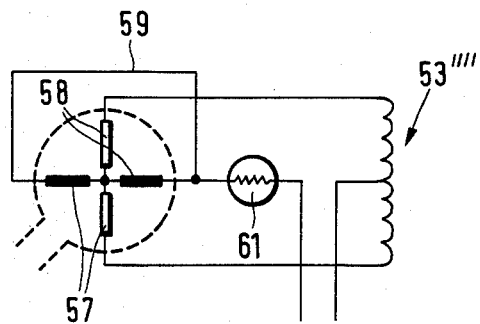
FIG. 8 is a schematic of another preferred embodiment of a probe portion of the preferred embodiment shown in FIG. 5.

FIGS. 6, 7 and 8 show additional probes which can be substituted in the embodiments of FIG. 4 or 5 in the manner of the invention. In the embodiment represented in FIG. 6, there are again two thermocouples 51" in the probe tube. With two resistors 54 and 55 situated outside of the probe tube they form a Wheatstone bridge. The signal to be fed to the amplifier (22''', 22'''' in FIGS. 4 and 5, but not shown in FIGS. 6 to 9) is picked up from the junctions of the bridge.

In the embodiment represented in FIG. 7, in addition to the two thermocouples 51''', a third thermocouple 56 is disposed in the probe tube. The measurement signal is picked up between the thermocouples 51''' and the approximate center of the secondary side of the transformer 53'' through the thermocouple 56 which serves to compensate for the room temperature.

In the embodiment represented in FIG. 8, two thermocouples 57 and 58 are connected together such that their centers are in contact. The two thermocouples 57 and 58 are contained in the probe tube. One pair of their extremities is connected to the secondary side of the transformer 53''''. The other pair of their extremities is connected together by a conductor 59. The signal that is to be fed to the amplifier is picked up between the center of the secondary side of the transformer 53 and the conductor 59. A thermistor 61 is additionally provided for room temperature compensation.

Figure 9:
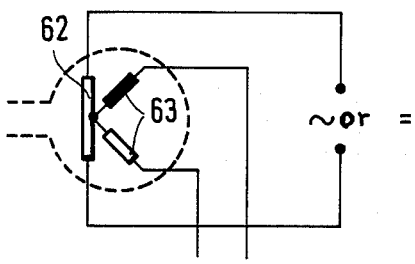
FIG. 9 is a schematic of another preferred embodiment of a probe portion of the preferred embodiment shown in FIG. 5.

FIG. 9 shows the commonest form of a probe which can be operated on direct or alternating current. It consists of a temperature-sensitive resistance 62 in the probe tube the temperature of which is measured by thermocouple 63 so as to form a measurement signal.

What is claimed is:

1. A thermal conductivity gage for measuring the vacuum (pressure) of a gas, comprising:
    at least one probe means in a probe unit including at least a temperature-dependent resistance element in thermal communication for said measuring, whereby the vacuum (pressure) of said gas affects the temperature-dependent resistance of said temperature-dependent resistance element;
    an operating unit including a power supply and an indicator;
    electrical conductor means for electrically connecting said probe means and said operating unit;
    a measuring circuit electrically connected to said operating unit, said measuring circuit connected by said conductor means to responsive means for response to the temperature-dependent resistance of said temperature-dependent resistance element and said indicator, a measuring electric current flowing within said measuring circuit which is changed by said responsive means, whereby to allow said indicator to reflect said vacuum affect on said temperature-dependent resistance of said temperature-dependent resistance element and thereby indicate the vacuum; and
    a power supply circuit to supply electrical current to said temperature-dependent resistance element and said measuring electric current,
    said measuring circuit having a portion in said probe means and a portion in said operating unit, and
    said power supply circuit having a portion in said probe means and a portion in said operating unit,
    said portion of said measuring circuit in said operating unit being identical with (the same as) said portion of said power supply circuit in said operating unit.

2. The vacuum gage of claim 1 wherein said portions of said measuring circuit and said portions of said power supply circuit in said probe means are the same.

3. The vacuum of claim 1 or 2 wherein said identical measuring circuit and power supply circuit portions in said operating unit comprise one of a a voltmeter connected across a load resistor and an ammeter, whereby to indicate the sum of said measuring current and said power supply current.

4. The vacuum gage of claim 1, and further comprising at least another one of said probe unit, said electrical conductor means comprising a common feed line and one return line per probe means.

5. The vacuum gage of claim 4 wherein each said return line comprises a conductor and means for measuring a current therein, whereby to indicate the vacuum sensed by each probe means with said current measuring means, said indicator indicating the average vacuum sensed thereof.

* * * * *